(12) United States Patent  (10) Patent No.: US 7,568,722 B2
Sato et al.  (45) Date of Patent: Aug. 4, 2009

(54) ARRANGEMENT STRUCTURE OF AIR BAG DEVICE

(75) Inventors: Hiroshi Sato, Utsunomiya (JP); Fumiharu Ochiai, Nasushiobara (JP)

(73) Assignee: Honda Motor Co., Ltd., Tokyo (JP)

( * ) Notice: Subject to any disclaimer, the term of this patent is extended or adjusted under 35 U.S.C. 154(b) by 261 days.

(21) Appl. No.: 11/463,726

(22) Filed: Aug. 10, 2006

(65) Prior Publication Data

US 2007/0046000 A1  Mar. 1, 2007

(30) Foreign Application Priority Data

Aug. 30, 2005 (JP) .............................. 2005-249368
Aug. 30, 2005 (JP) .............................. 2005-249369
Mar. 9, 2006 (JP) .............................. 2006-064148

(51) Int. Cl.
*B60R 21/16* (2006.01)
(52) U.S. Cl. ................................. 280/728.2; 280/730.2
(58) Field of Classification Search .............. 280/730.2, 280/728.2, 728.3
See application file for complete search history.

(56) References Cited

U.S. PATENT DOCUMENTS

| 6,378,896 | B1 * | 4/2002 | Sakakida et al. | 280/730.2 |
| 7,413,215 | B2 * | 8/2008 | Weston et al. | 280/730.2 |
| 2003/0234522 | A1 * | 12/2003 | Thomas | 280/730.2 |
| 2006/0197322 | A1 * | 9/2006 | Riester et al. | 280/730.2 |
| 2007/0029764 | A1 * | 2/2007 | Ochiai et al. | 280/730.2 |
| 2007/0029765 | A1 * | 2/2007 | Ochiai et al. | 280/730.2 |
| 2007/0145726 | A1 * | 6/2007 | Ochiai et al. | 280/730.2 |

FOREIGN PATENT DOCUMENTS

JP  03-284443  12/1991
JP  06-227350  8/1994

* cited by examiner

*Primary Examiner*—Faye M. Fleming
(74) *Attorney, Agent, or Firm*—Rankin Hill & Clark LLP

(57) ABSTRACT

An arrangement structure of an air bag device that is provided on a panel in the vicinity of a window of a vehicle includes: an air bag; a first cover that covers a cabin interior side of the air bag; a second cover that is joined to the first cover directly or by a intermediate member; and a lining that has a notch portion of substantially the same size as the first cover and that is provided on the cabin interior side of the panel. The air bag in a folded state is housed in a space formed by the first cover and the second cover.

14 Claims, 14 Drawing Sheets

ARRANGEMENT STRUCTURE OF AIR BAG DEVICE

BACKGROUND OF THE INVENTION

1. Field of the Invention

The present invention relates to a housing portion structure that houses an air bag that deploys along the window during inflation and an arrangement structure of an air bag device that includes the housing portion.

Priority is claimed on Japanese Unexamined Patent Application Nos. 2005-249368 and 2005-249369 filed Aug. 30, 2005, and Japanese Unexamined Patent Application No. 2006-64148 filed Mar. 9, 2006, the content of which is incorporated herein by reference.

2. Description of Related Art

Among air bag devices used as occupant protective devices mounted in a vehicle, there a door-mounted air bag device in which an air bag disposed between an inner panel of a door and a lining that covers the cabin interior side thereof is deployed upward along the inside surface of the window (for example, refer to Japanese Patent No. 2941879). This air bag device is made into a unit by housing the air bag in a folded state and the inflator in a case, and attaching this unit to a stepped portion formed in the upper portion of the inner panel of the door. Then, the air bag device thus attached to this inner panel is covered by the door lining.

During a vehicle collision, the door-mounted air bag device protects an occupant by deploying the air bag along the inside surface of the window. As a housing portion structure for housing such an air bag in a vehicle, there is known to be one that has an opening for passing a deploying air bag in the door lining that covers the cabin interior side of the inner panel, with this opening being closed by a lid that is opened by pushing the lid with the air bag during deployment (for example, refer to Japanese Unexamined Patent Application, First Publication No. H06-227350).

However, in the case of such a structure in which the air bag device attached to the inner panel is covered by the door lining, there has been a problem in that much of the space in the door lining is taken up by the air bag device. Also, there has been a problem in that providing a lid in the door lining causes an increase in the cost of the door lining.

Moreover, a structure that opens a lid by pushing against it with a deploying air bag as described above cannot control the amount of opening of the lid, and so there is the possibility of the opened lid cramping the cabin space by more than is needed.

SUMMARY OF THE INVENTION

An object of the present invention is to provide an arrangement structure of an air bag device that deploys an air bag upward from below a window, with the structure capable of reducing the proportion of space taken up by the air bag device within the lining and reducing the cost of the lining.

Another object of the present invention is to provide an air bag housing portion structure that can prevent the lid from cramping the cabin space by more than is needed during deployment of the air bag.

A first aspect of the present invention is an arrangement structure of an air bag device that is provided on a panel in the vicinity of a window of a vehicle including: an air bag; a first cover that covers a cabin interior side of the air bag; a second cover that is joined to the first cover directly or by an intermediate member; and a lining that has a notch portion of substantially the same size as the first cover and that is provided on the cabin interior side of the panel; wherein the air bag in a folded state is housed in a space formed by the first cover and the second cover.

According to the arrangement structure of an air bag device of the present invention, the air bag device has a first cover that covers the cabin interior side of the air bag in a folded state. In this way, since the first cover, which is a portion of the air bag device, is arranged in the notch portion that is formed in the lining, the share of the lining taken up by the air bag device can be reduced to this portion. Also, since the notch portion may be formed in the lining, the cost of the lining can be reduced. Moreover, since the lining and the first cover are separate elements, effects of the deformation of the lining can be prevented from extending to the first cover side.

Also, since the notch portion has a shape that fits with the first cover, a good appearance can be achieved. Moreover, since the air bag is, in a folded state, housed in a case that includes the first cover and the second cover joined to the first cover, it is easy to handle, and scratches and the like during installation can be prevented.

The first cover may have a consecutive appearance with the lining. In this case, the first cover forms the design surface of the cabin side together with the lining.

The second cover may be fixed to the panel. In this case, since the air bag device is attached to the panel, there is no need to dismount the air bag device when removing the lining for maintenance, and so good workability is obtained. Also, since the position of the air bag device does not change even when the lining is removed, good performance can be maintained.

The arrangement structure of an air bag device of the present invention may further include a regulating member that regulates an opening angle of the first cover. In this case, when the first cover opens to the cabin interior side by being pushed by the deploying air bag, the regulating member provided on the first cover regulates the opening amount of the first cover. Accordingly, during deployment of the air bag the first cover can be prevented from cramping the cabin interior space by more than is needed.

The arrangement structure of an air bag device of the present invention may further include a fixed member which is fixed to a vehicle body of the vehicle and does not move when the air bag deploys, wherein a first end of the regulating member is connected to the first cover and a second end of the regulating member is connected to the fixed member. In this case, when the first cover opens to the cabin interior side by being pushed by the deploying air bag, the regulating member, of which one side is connected to the first cover and the other side is connected to the fixed member, regulates the opening amount of the first cover. Accordingly, during deployment of the air bag, the first cover can be prevented from cramping the cabin interior space by more than is needed. Moreover, since the first cover and the fixed member are only coupled by a coupling member, the opening amount of the first cover can be readily and reliably regulated.

The shape of the regulating member may be a line shape. In this case, the space for housing the regulating member can be made small.

The arrangement structure of an air bag device of the present invention may further include a fixed member which is fixed to a vehicle body of the vehicle and does not move when the air bag deploys, wherein the regulating member has an abutting portion that abuts the fixed member. In this case, when the first cover opens to the cabin interior side by being pushed by the deploying air bag, the regulating member provided on the first cover abuts the fixed member to regulate the opening amount of the first cover. Accordingly, during deployment of the air bag, the first cover can be prevented from cramping the cabin interior space by more than is needed. Moreover, since the regulating member is only made to abut the fixed member, the opening amount of the first cover can be readily and reliably regulated.

The regulating member may have an extension portion that extends below the first cover, and the abutting portion may be provided on the extension portion. In this case, the degree of opening of the first cover is not impaired by the regulating member.

The second cover may have an engagement portion, and the abutting portion may abut the engagement portion. In this case, since the regulating member has a portion to be engaged that is engaged with the engagement portion provided in the housing member that houses the air bag, the opening amount of the first cover can be still more reliably regulated.

The arrangement structure of the air bag of the present invention may further include a regulating portion that regulates the deployment direction of the air bag. In this case, when the first cover opens to the cabin interior side by being pushed by the deploying air bag, the air bag is guided by the regulating portion of the first cover whose opening amount is regulated by the regulating member, and the deployment direction can be regulated. Accordingly, the deployment direction of the air bag can be favorably controlled.

The first cover may have a curved portion that extends in the longitudinal direction of the vehicle, and the regulating portion may be provided on this curved portion. In this case, since the regulating portion is provided on the curved portion, the deploying air bag can be prevented from abutting the curved portion. Accordingly, the air bag can be still more favorably deployed.

The regulating portion may be a rib that is provided in an extending manner from the first cover. In this case, since the regulating portion is a rib that is provided in an extending manner on the lid, it can also function as a rib for increasing the rigidity of the first cover. Accordingly, manufacturing is simplified.

DETAILED DESCRIPTION OF THE INVENTION

Figure 1:
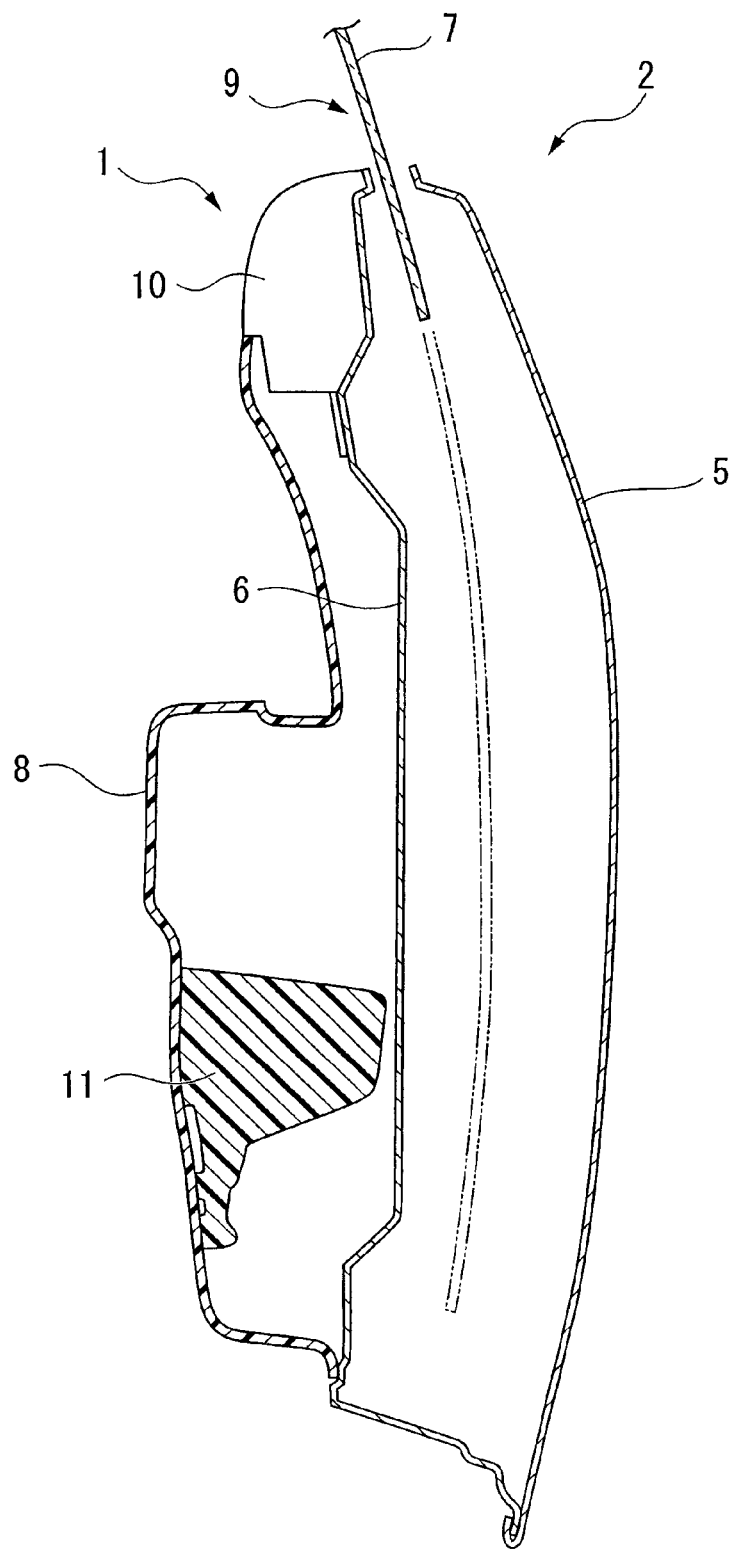
FIG. 1 is a sectional view schematically showing a door to which the arrangement structure of an air bag device of the first embodiment of the present invention has been applied.

The arrangement structure of an air bag device of the first embodiment of the present invention is explained below referring to the drawings.

FIG. 1 schematically shows the cross section of a door 2 on the right side of a vehicle to which the arrangement structure of the air bag device 1 of the present embodiment is applied. In the drawing, the left side of the drawing is the cabin interior side, and the right side of the drawing is the vehicle exterior side. The vehicle to which the air bag device 1 is provided is an open-roof vehicle in which the roof can be opened and closed or is detachable. Note that in the explanation given below, the door 2 is in a closed state.

The door 2 has a metal outer panel 5, a metal inner panel (panel) 6, a window glass 7 that can move up and down, and a door lining (lining) 8. The outer panel 5 is disposed along the vehicle longitudinal direction on the cabin exterior side, and composes the design surface of the cabin exterior side. The inner panel 6 is disposed along the vehicle longitudinal direction on the cabin interior side of the outer panel 5. The window glass 7 is disposed along the vehicle longitudinal direction, between the outer panel 5 and the inner panel 6, and rises so as to extend upward therebetween. The door lining 8 covers the cabin interior side of the inner panel 6, and forms a design surface of the cabin interior side. A window 9 is above the outer panel 5, the inner panel 6, and the door lining 8. The window 9 is opened and closed by raising and lowering the window glass 7 that constitutes a portion thereof. In other words, the outer panel 5, the inner panel 6, and the door lining 8 are disposed on the lower side of the window 9, that is, under the window. The metal outer panel 5 and inner panel 6 are high rigidity portions of the door 2, and constitute a portion of the vehicle body when the door is closed.

An air bag module 10 of the air bag device 1 is provided at the upper part between the inner panel 6 and the door lining 8, and a lower impact absorption member 11 for absorbing the impact near the hip of the occupant when the occupant impacts with the door 2 is provided at the lower portion between the inner panel 6 and the door lining 8.

Figure 2:
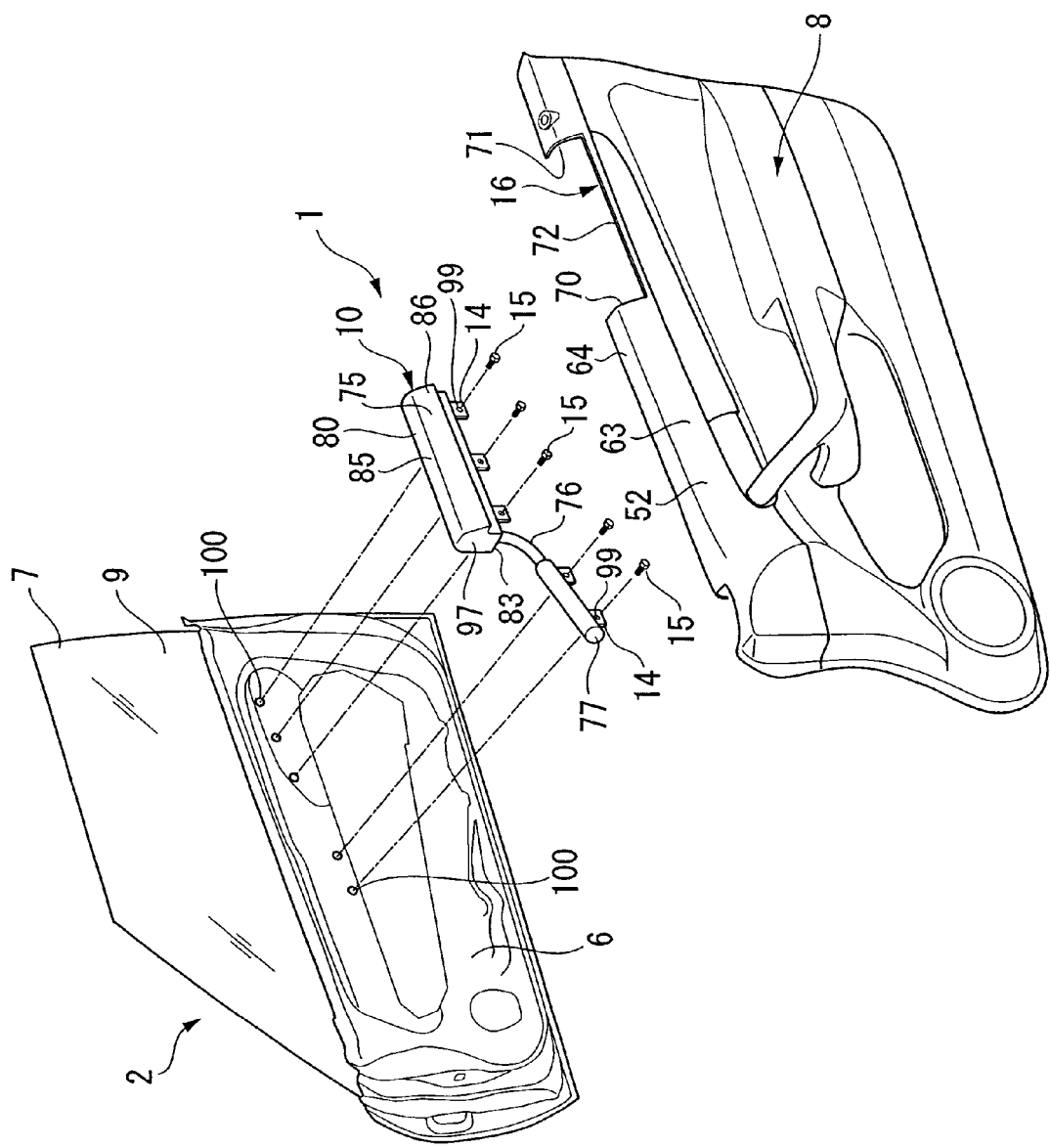
FIG. 2 is an exploded perspective view showing the arrangement structure of an air bag device of the first embodiment.

FIG. 2 is an exploded perspective view of the aforementioned door 2. As shown in FIG. 2, the air bag module 10 of the air bag device 1 is fixed to the cabin interior side of the inner panel 6 by bolts 15 through a plurality of mounting pieces 14 that are arranged on the lower portion side-by-side in the longitudinal direction of the vehicle. Although not illustrated in the drawing, a waterproof sheet is adhered to the cabin interior side of the inner panel 6.

A notch portion 16 that forms a rectangular shape in the plan view and side view is formed in a specified range to the rear of the upper edge portion of the door lining 8. The air bag module 10 is arranged so that a portion thereof fits with this notch portion 16.

Figure 3:
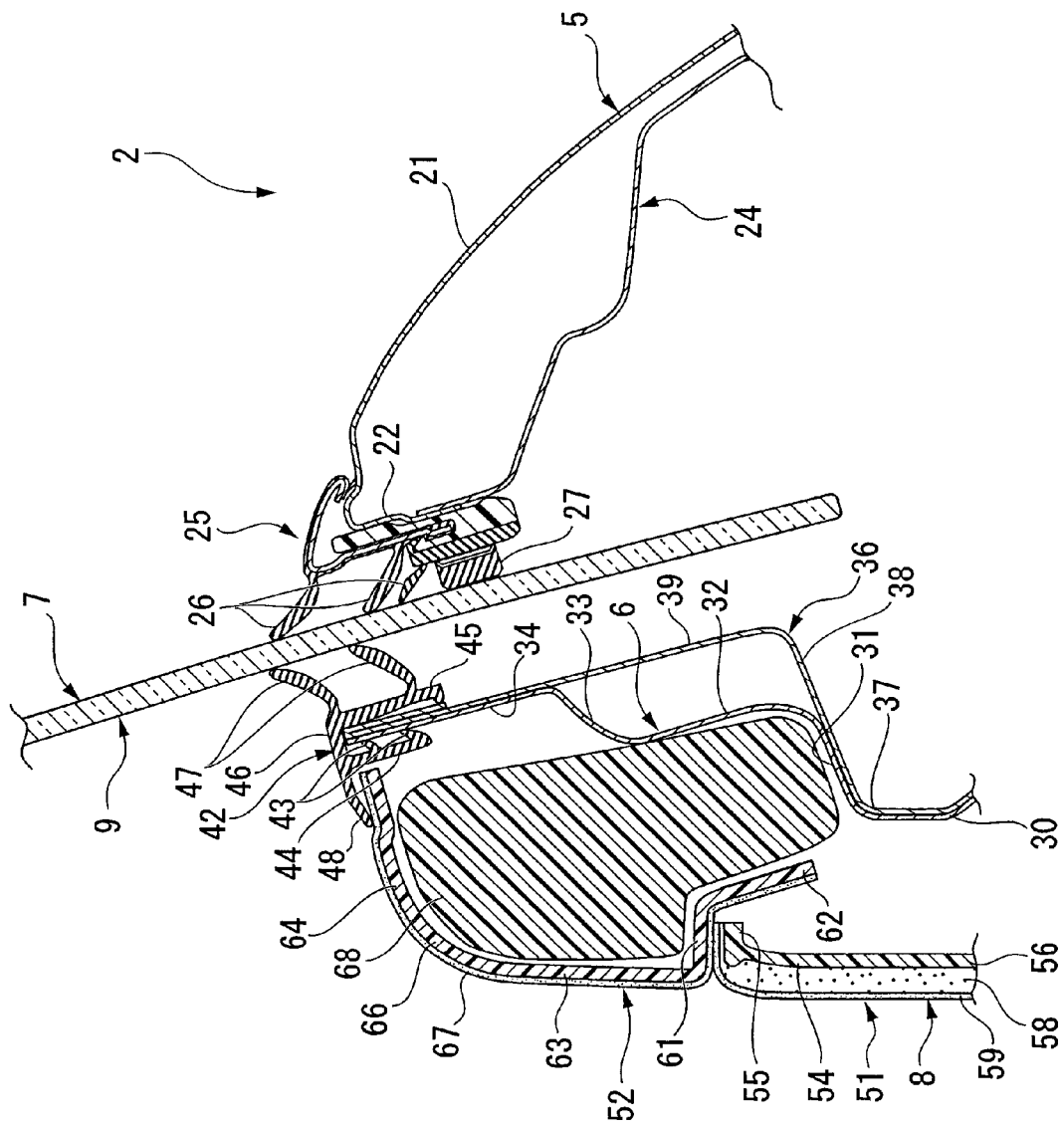
FIG. 3 is a sectional view showing the upper portion of a door to which the arrangement structure of an air bag device of the first embodiment has been applied.

FIG. 3 shows in detail the upper portion cross section of the door 2 where the air bag module 10 is not arranged. The outer panel 5 has an external panel portion 21 and a joining panel portion 22. The external panel portion 21 constitutes the design surface of the cabin exterior side, with the upper portion thereof extending upward while sloping to the cabin interior side. The external panel portion 21 is folded back at the upper portion, with the joining panel portion 22 formed at the portion extending downward. A metal outer side reinforcement panel 24 is joined to the bottom of the joining panel portion 22 on the cabin exterior side. This outer side reinforcement panel 24 serves to reinforce the upper portion of the outer panel 5, with its lower portion side being disposed so as to approach the outer panel 5 side. An outer side weatherstrip 25 that seals the gap with the window glass 7 is attached to the upper side from the joined portion of the outer panel 5 and the outer side reinforcement panel 24. Here, the outer side weatherstrip 25 seals by contacting the window glass 7 with a plurality of sealing lips 26 in the vertical direction and a square bar-shaped sealing member 27 disposed thereunder.

The upper portion of the inner panel 6 has an inside plate portion 30 provided on the cabin interior side, a step plate portion 31, a middle plate portion 32, a step plate portion 33, and an upper plate portion 34. The step plate portion 31 extends upward while sloping from the upper edge of the inside plate portion 30 toward the cabin exterior side. The middle plate portion 32 extends upward while sloping from the outer side outer edge of the step plate portion 31 in the vehicle width direction to the cabin interior side. Also, the step plate portion 33 extends upward while sloping from the upper edge of the middle plate portion 32 toward the cabin exterior side, and the upper plate portion 34 extends upward while sloping from the outer side outer edge of the step plate portion 33 in the vehicle width direction to the cabin interior side. A metal inner reinforcing panel 36 is joined to the cabin exterior side of the upper portion of the inner panel 6 for reinforcing the upper portion of the inner panel 6.

The inner reinforcing panel 36 has an inside plate portion 37, a step plate portion 38, and an upper plate portion 39. The inside plate portion 37 is joined to the cabin exterior side of the inside plate portion 30 of the inner panel 6. The step plate portion 38 extends upward while sloping from the upper edge of the inside plate portion 37 toward the cabin exterior side, and is joined to the bottom side of the step plate portion 31 of the inner panel 6. The upper plate portion 39 extends upward while sloping from the outer side outer edge of the step plate portion 38 in the vehicle width direction to the cabin interior side and is joined to the cabin exterior side of the upper plate portion 34 of the inner panel 6. Thereby, the step plate portion 31, the middle plate portion 32, the step plate portion 33, and the upper plate portion 34 of the inner panel 6, together with the step plate portion 38 and the upper plate portion 39 of the inner reinforcing panel 36 form a closed-section structure.

An inner side weatherstrip 42 that seals the gap with the window glass 7 is attached at the upper portion of the joined portion of the upper plate portion 34 of the inner panel 6 and the upper plate portion 39 of the inner reinforcing panel 36 so as to sandwich the upper plate portions 34 and 39. That is, the inner side weatherstrip 42 includes a pinching piece 44, a pinching piece 45, and a coupling portion 46. The pinching piece 44 is disposed on the cabin interior side of the upper plate portion 34, and has a plurality of locking tongue pieces 43 that extend to the cabin exterior side. The pinching piece 45 is disposed on the cabin exterior side of the upper plate portion 39. Also, the coupling portion 46 couples the upper portions of the pinching pieces 44 and 45. That is, inner side weatherstrip 42 holds the upper plate portions 34 and 39 by the pinching piece 44 and the pinching piece 45. Also, the inner side weatherstrip 42 includes a plurality of sealing lips 47 in the vertical direction and a contact tongue piece 48. The sealing lips 47 extend from the pinching piece 45 in the direction of the window glass 7, and make contact with the window glass 7. The contact tongue piece 48 extends to the cabin interior side to form an approximately coplanar surface with the coupling portion 46.

The door lining 8 includes a lining body 51 that constitutes the middle and lower portions of the door lining 8, and an upper lining 52 that is disposed between the lining body 51 and the inner side weatherstrip 42.

The upper portion of the lining body 51 includes a comparatively hard lining core material 56, a soft lining base material 58, and a skin material 59. The lining base material 58 covers the cabin interior side of the lining core material 56. Also, the skin material 59 covers the cabin interior side and the upper side of the lining base material 58. The lining body 51 has a main plate portion 54 and a projection plate portion 55. The main plate portion 54 is a portion that extends in the vertical direction, and the projection plate portion 55 is a portion that projects slightly from the upper end of the main plate portion 54 to the cabin exterior side.

The upper lining 52 includes a comparatively hard lining core material 66 that is totally covered on the cabin interior side and upper side with a skin material 67. The upper lining 52 has a mounting plate portion 61, a support plate portion 62, a middle plate portion 63, and an upper plate portion 64. The mounting plate portion 61 is a portion horizontally arranged on the top of the lining body 51. The support plate portion 62 is a portion that extends downward while sloping from the cabin exterior side outer edge of the mounting plate portion 61 to the cabin exterior side. The middle plate portion 63 is a portion that extends upward from the cabin interior side inner edge of the mounting plate portion 61. The upper plate portion 64 is a portion that extends upward to the cabin exterior side, while curving from the upper edge of the middle plate portion 63. The mounting plate portion 61 is joined and fixed to the upper portion of the lining body 51, and the contact tongue piece 48 of the inner side weatherstrip 42 is made to abut the top side of the end edge portion of the upper plate portion 64. An upper impact absorption member 68 is provided at a position where the air bag module 10 is not arranged, between the inner panel 6 and the upper lining 52.

Figure 4:
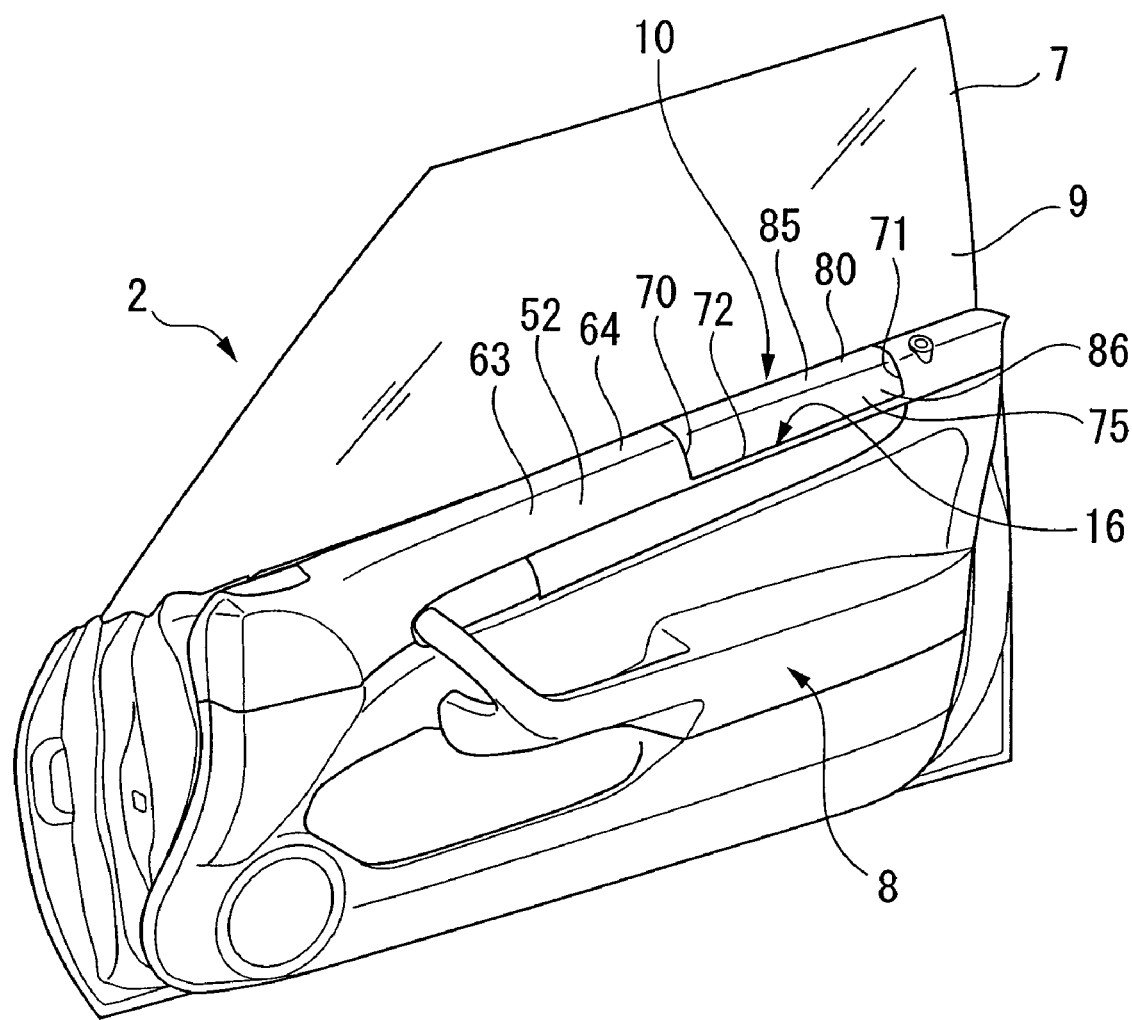
FIG. 4 is a perspective view showing the assembled state of the arrangement structure of an air bag device of the first embodiment.

As shown in FIG. 4, the notch portion 16 has a front edge portion 70 that is formed to be perpendicular to the vehicle longitudinal direction in a manner that traverses the upper plate portion 64 of the upper lining 52 and extends until the lower end portion of the middle plate portion 63, and a rear edge portion 71 rearward of the front edge portion 70 that is formed to be perpendicular to the vehicle longitudinal direction in a manner that traverses the upper plate portion 64 of the upper lining 52 and extends until the lower end portion of the middle plate portion 63, and a lower edge portion 72 that is formed to connect along the vehicle longitudinal direction the lower end portion of the front edge portion 70 and the lower end portion of the rear edge portion 71 at the bottom portion of the middle plate portion 63 of the upper lining 52.

Figure 5:
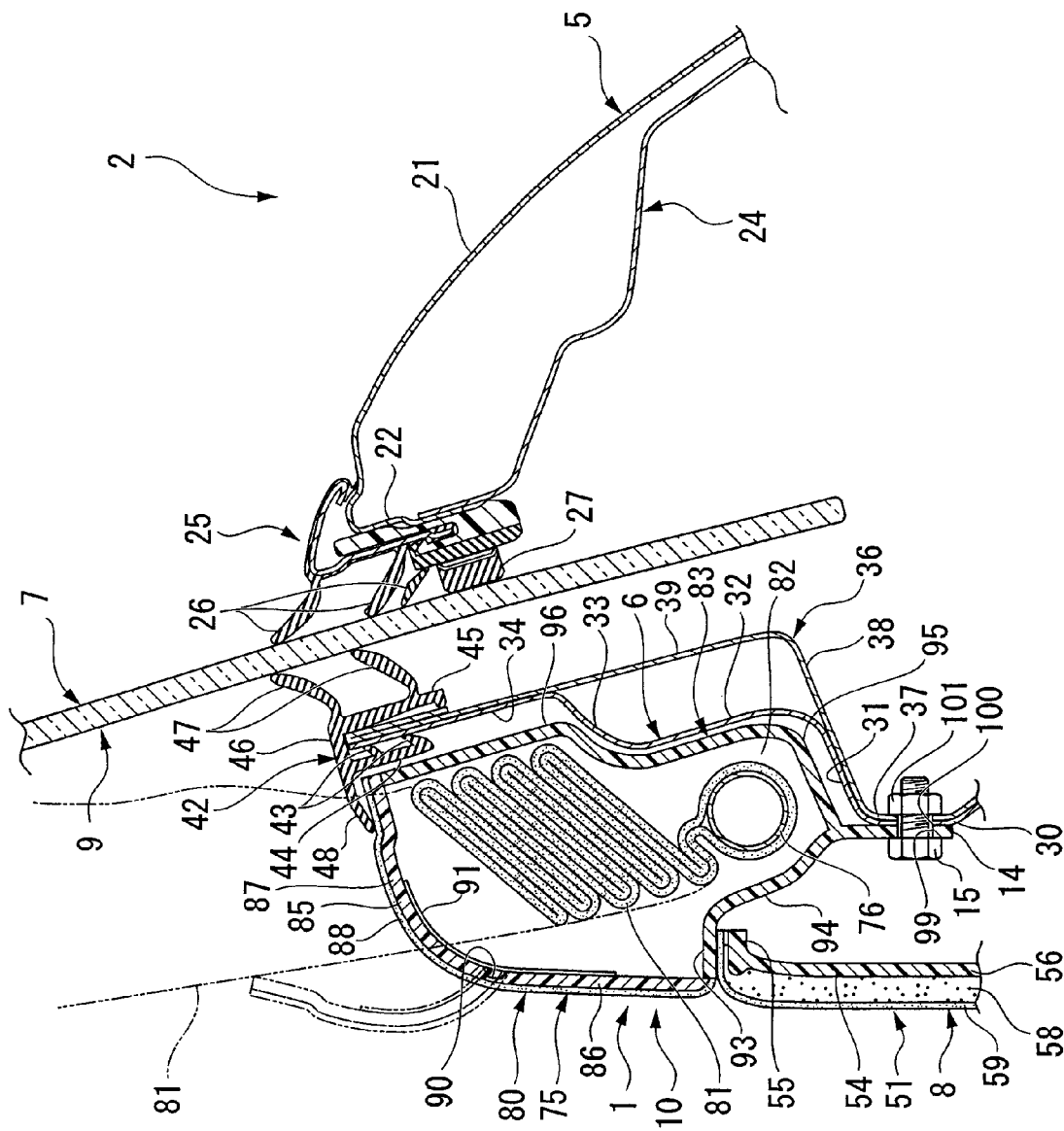
FIG. 5 is another sectional view showing the upper portion of a door to which the arrangement structure of an air bag device of the first embodiment has been applied.

As shown in FIG. 2 and FIG. 5, the air bag module 10 has a case 75, a pipe 76 that extends in the vehicle longitudinal direction from the bottom of the case 75, and an inflator 77 that is connected to the opposite side of the pipe 76 than the case 75.

The case 75 is a box-shaped component that has a rear cover body (second cover) 83 that is joined to the inner panel 6 and a front cover body (first cover) 80 that is attached to the cabin interior side of the rear cover body 83. The front cover body 80 has a shape that fits the notch portion 16 of the door lining 8 as shown in FIG. 4 in the state of the air bag module 10 and the door lining 8 being attached to the inner panel 6. The front cover body 80 may be attached to the rear cover body 83 directly or by an attaching member. The interior of the case 75 serves as a housing space 82 that houses an air bag 81 shown in FIG. 5 of the air bag module 10. The air bag 81 is folded so as to be successively piled upward, and is housed in the case 75 in this folded state. The inflator 77 is filled with a propellant that generates high pressure gas (fluid) by combustion. The air bag 81 inflates with gas that is introduced from the inflator 77 via the pipe 76 that fitted to the bottom.

As shown in FIG. 4, the front cover body 80 has a top plate portion 85 that composes the consecutive design surface of the cabin side and a front plate portion 86 that composes the consecutive design surface of the cabin side. In the state of the air bag module 10 being attached to the inner panel 6 along with the door lining 8, the top plate portion 85 is arranged without gaps with respect to the front edge portion 70 and the rear edge portion 71 of the notch portion 16 to be flush with the upper plate portion 64 of the door lining 8, and the front plate portion 86 is arranged without gaps with respect to the front edge portion 70, the rear edge portion 71, and the lower edge portion 72 of the notch portion 16 to be flush with the middle plate portion 63 of the door lining 8. As shown in FIG. 5, the contact tongue piece 48 of the inner side weatherstrip 42 is made to abut the top side of the end edge portion of the top plate portion 85. The front cover body 80, similarly to the upper lining 52, is constituted by totally covering the cabin interior side and the upper side of a comparatively hard lining core material 87 with a skin material 88. At least the same material as the skin material 67 of the upper lining 52 is used as the skin material 88. On the cabin exterior side of the boundary area between the top plate portion 85 and the front plate portion 86, a groove portion 90 is formed that extends over the entire length in the vehicle longitudinal direction. A coating material 91 is adhered to the cabin exterior side of the lining core material 87 from the top plate portion 85 to the front plate portion 86 so as to cover this groove portion 90.

The rear cover body 83 has an inner plate portion 93, a lower extension plate portion 94, a bottom plate portion 95, a back plate portion 96 and side plate portions 97. The inner plate portion 93 is joined to the lower end edge portion of the front plate portion 86 of the front cover body 80 and extends from this lower end edge portion to the cabin exterior side. The lower extension plate portion 94 extends downward from the end edge portion on the cabin exterior side of the inner plate portion 93. The bottom plate portion 95 extends from the lower end edge portion of the lower extension plate portion 94 to the cabin exterior side. The back plate portion 96 rises from the cabin exterior side of the end edge portion of the bottom plate portion 95 and abuts the cabin exterior side of the end edge portion of the top plate portion 85 of the front cover body 80 from below. The side plate portions 97 shown in FIG. 2 extend from the respective end edge portions of the inner plate portion 93, the lower extension plate portion 94, the bottom plate portion 95, and the back plate portion 96 that are continuous on both sides in the vehicle longitudinal direction to close both sides of the housing space 82 in the vehicle longitudinal direction. The case 75 is constituted by the inner plate portion 93 being joined to the front cover body 80 at a suitable position excluding the region on the top plate portion 85 side of the position of the groove portion 90.

As shown in FIG. 5, the mounting pieces 14 are formed on the lower portion of the rear cover body 83, and the bolts 15 are inserted into mounting holes 99 of the mounting pieces 14, passed through mounting holes 100 formed in the inner panel 6 and the inner reinforcing panel 36, to be screwed into weld nuts 101 that are fixed to the rear side of the inner reinforcing panel 36. Thereby, the air bag module 10 is attached to the inner panel 6.

The air bag 81 is folded so as to be piled successively upward with respect to the pipe 76, which is the gas supply portion. For this reason, when the air bag 81 deploys by the gas that the inflator 77 generates, it normally deploys upward. The air bag 81 has a long shape in the vehicle longitudinal direction. Non-inflating portions not illustrated that do not inflate are formed by sewing, adhesion or weaving such as jacquard weaving, with a plurality being provided side-by-side in the vehicle longitudinal direction. Thereby, the air bag 81 as a whole inflates in a plate shape.

When the deployment condition of the aforementioned air bag device 1 is met during a vehicle collision, such as a G-force equal to or greater than a predetermined amount being detected, the inflator 77 ignites. Since the air bag 81 is folded in a manner to be successively overlapped upward, it deploys so as to extend upward from below the window 9 as shown by the double-dashed line in FIG. 5. During deployment, the air bag 81 mainly pushes the upper plate portion 85 of the front cover body 80. The upper portion that is thus pressed is made to rotate, centered on the fragile groove portion 90, so as to pass over the contact tongue piece 48. Thereafter, the air bag 81 deploys upward along the inner surface of the window glass 7 of the window 9 above.

According to the arrangement structure of the air bag device 1 of the present embodiment as described above, the air bag 1 has a front cover body 80 that covers the cabin interior side of the air bag 81 in the folded state. By arranging this front cover body 80 in the notch portion 16, which is formed in the door lining 8, the front cover body 80 forms the cabin-side design surface together with the door lining 8. Thus, since one portion of the air bag device 1 is arranged in the notch portion 16 that is formed in the door lining 8, the share of the door lining 8 taken up by the air bag device 1 can be minimized to that portion. Also, since it is acceptable to only form the notch portion 16 in the door lining 8 without providing a lid, the cost of the door lining 8 can be reduced. Moreover, the fact that the door lining 8 and the front cover body 80 are separate elements can prevent effects of the deformation of the door lining 8 from extending to the front cover body 80.

Also, in the state of the air bag device 1 being attached to the inner panel 6 along with the door lining 8, the top plate portion 85 is arranged without gaps with respect to the front edge portion 70 and the rear edge portion 71 of the notch portion 16 to be flush with the upper plate portion 64 of the door lining 8, and the front plate portion 86 is arranged without gaps with respect to the front edge portion 70, the rear edge portion 71, and the lower edge portion 72 of the notch portion 16 to be flush with the middle plate portion 63 of the door lining 8, so that the front cover body 80 has a shape that fits with the notch portion 16. For this reason, a good appearance can be achieved.

Moreover, since the air bag 81 is, in a folded state, housed in the case 75, which includes the front cover body 80 joined to the rear cover body 83, it is easy to handle, and scratches and the like during installation can be prevented.

In addition, since the air bag device 1 is attached to the inner panel 6, there is no need to dismount the air bag device 1 when removing the door lining 8 for maintenance, and so good workability is obtained. Also, since the position of the air bag device 1 does not change even when the door lining 8 is removed, good performance can be maintained.

An explanation was given above using as an example an arrangement structure of the air bag device 1 provided in the door 2 of a vehicle. However, it may be applied to an arrangement structure of an air bag device that is provided below a rear side window in a coupe-type vehicle and applied to an arrangement structure of an air bag device that is provided below a tailgate window as long as it is an arrangement structure of an air bag device that is provided under a window and deploys an air bag upward along the inside surface of the window.

The air bag housing portion structure of the second embodiment of the present invention is explained below referring to FIGS. 6 to 9, focusing on portions differing from the aforementioned first embodiment. Therefore, portions similar to those in the first embodiment shall be given the same reference numerals and explanations thereof shall be omitted here.

Figure 6:
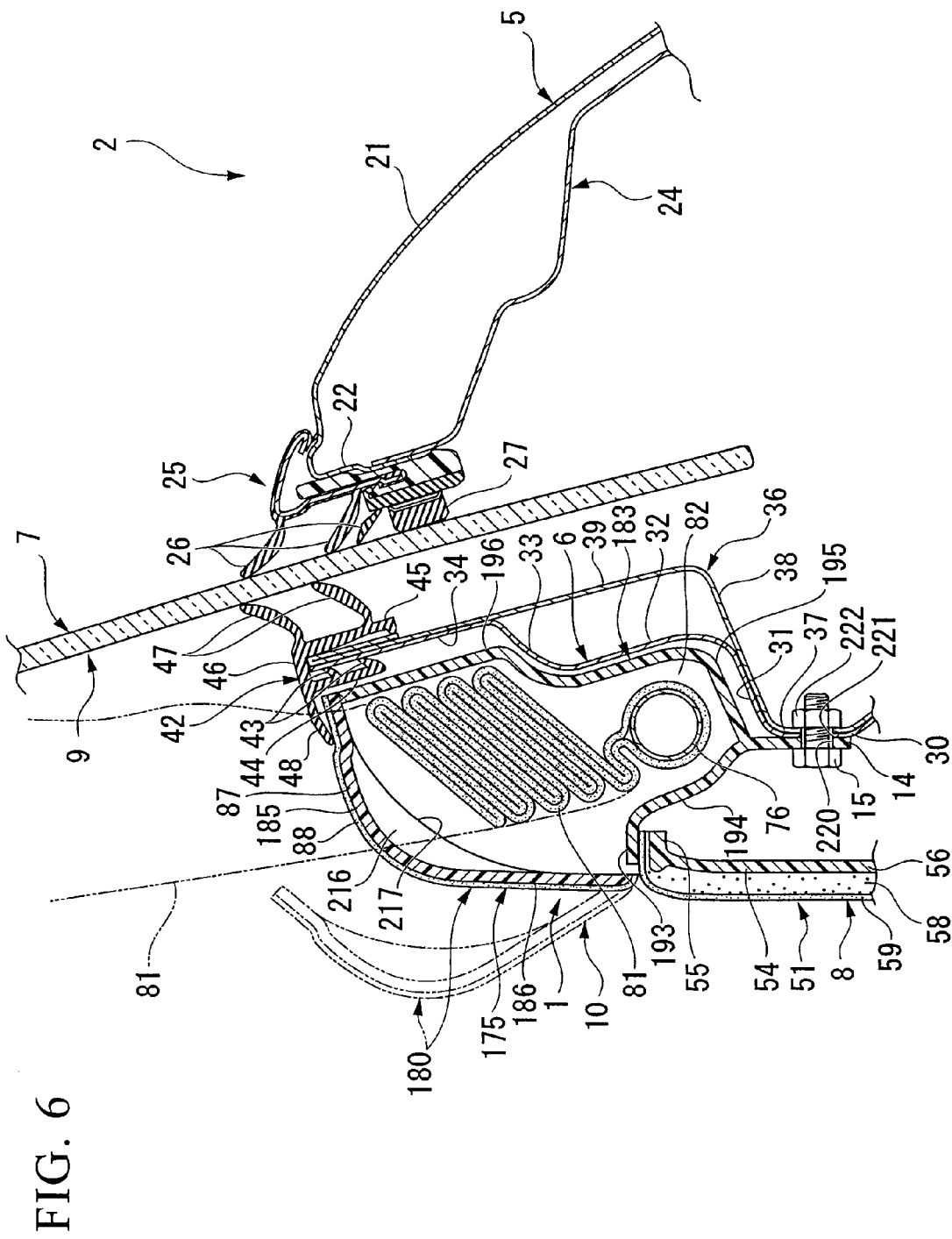
FIG. 6 is a sectional view of the upper portion of a door to which the air bag housing portion structure of the second embodiment of the present invention has been applied.

In the second embodiment, as shown in FIG. 6, a case 175 that corresponds to the case 75 of the first embodiment is a box-shaped component that has a case body (housing member) 183 that is joined to the inner panel 6 and a lid 180 that is attached to the cabin interior side of the case body 183. The lid 180 has a shape that fits the notch portion 16 of the door lining 8 when the air bag module 10 and the door lining 8 are attached to the inner panel 6.

Figure 7:
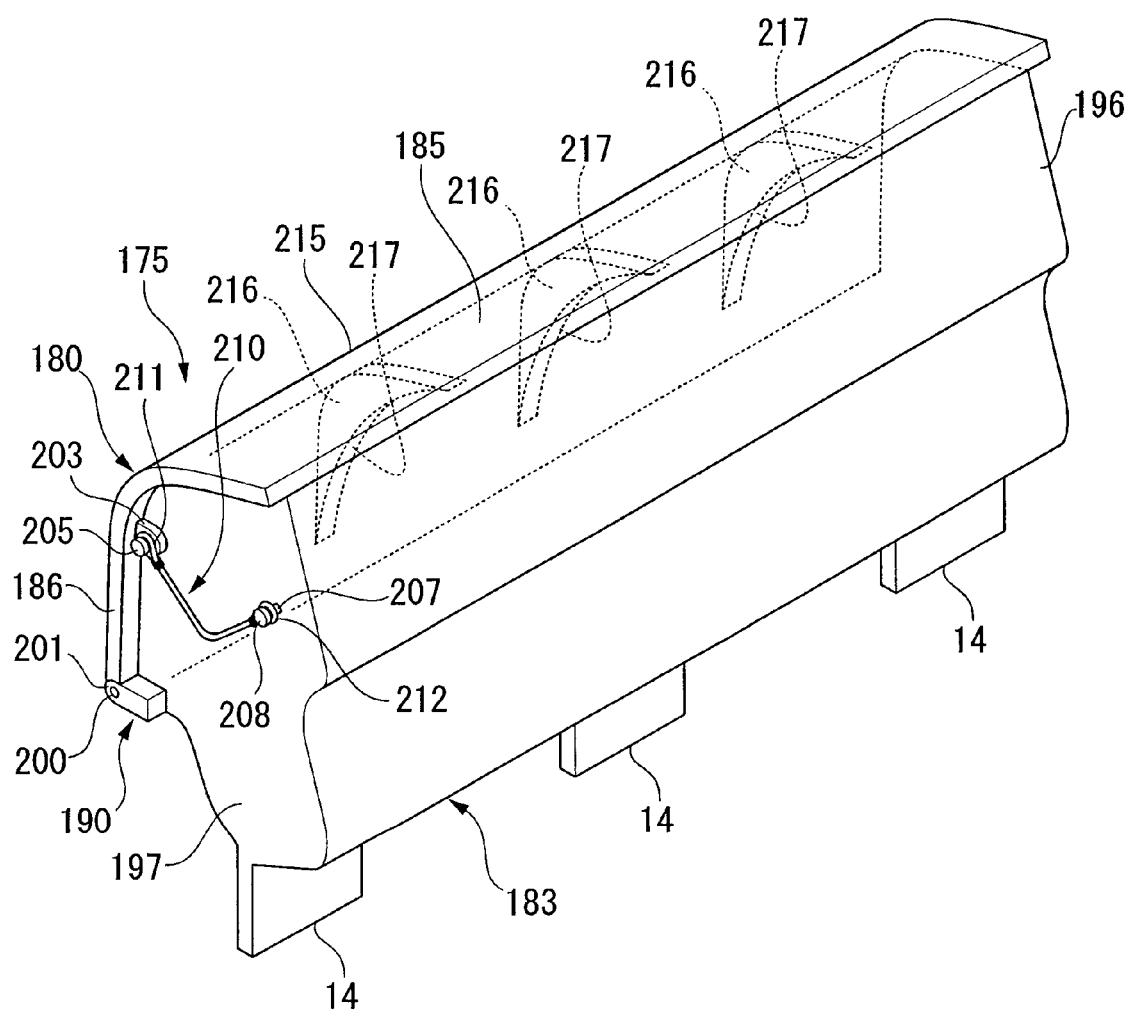
FIG. 7 is a perspective view showing the air bag housing portion structure of the second embodiment.

In the state of the air bag module 10 being attached to the inner panel 6 along with the door lining 8, the lid 180 has a top plate portion 185 that composes a design surface of the cabin side and a front plate portion 186 that composes a design surface of the cabin side. The top plate portion 185 is arranged without gaps between the front edge portion 70 and the rear edge portion 71 of the notch portion 16 of the door lining 8 to be flush with the upper plate portion 64 of the door lining, and the front plate portion 186 is arranged without gaps between the front edge portion 70, the rear edge portion 71, and the lower edge portion 72 of the notch portion 16 to be flush with the middle plate portion 63 of the door lining 8. As shown in FIG. 6, the contact tongue piece 48 of the inner side weatherstrip 42 is made to abut the top side of the end edge portion of the top plate portion 185. The lid 180 is constituted by a hard lining core material 87 that is totally covered on the cabin interior side and upper side with a skin material 88. At least the same material as the skin material 67 of the upper lining 52 is used as the skin material 88. As shown in FIG. 7, a coupling portion 190 that rotatably couples the lid 180 to the case body 183 is provided on the bottom side of the front plate portion 186.

Figure 8:
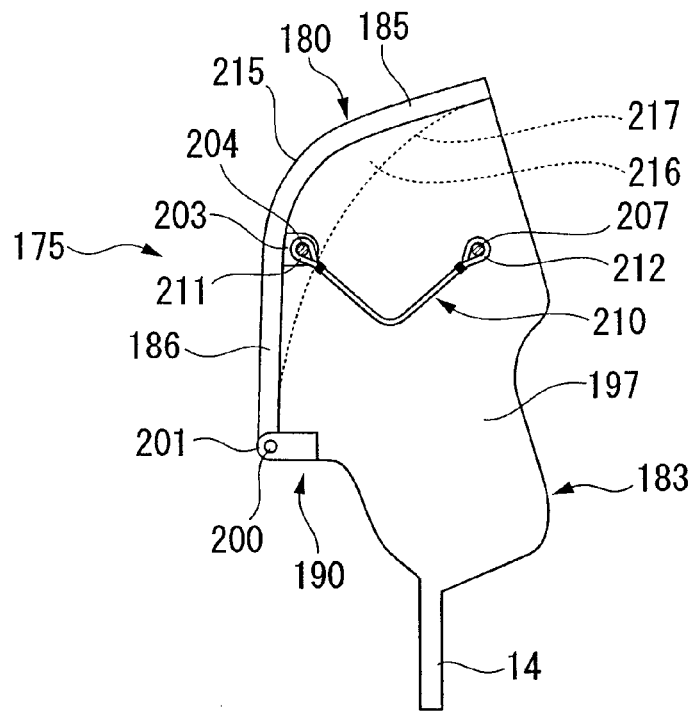
FIG. 8 is a side elevational view showing the closed state of the lid in the air bag housing portion structure of the second embodiment.
Figure 9:
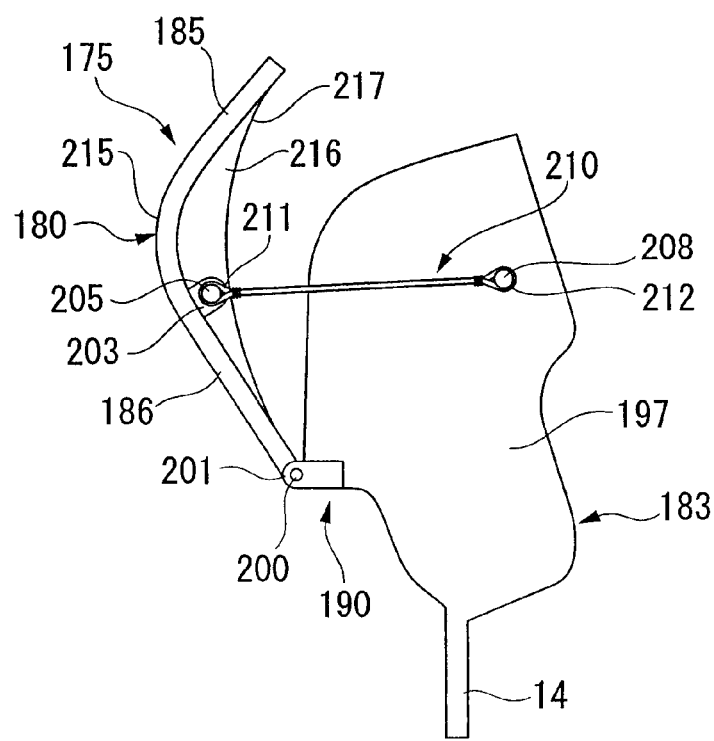
FIG. 9 is a side elevational view showing the opened state of the lid in the air bag housing portion structure of the second embodiment.

The case body 183, as shown in FIG. 6, has an inner plate portion 193, a lower extension plate portion 194, a bottom plate portion 195, a back plate portion 196 and side plate portions 197. The inner plate portion 193 is disposed horizontally on the cabin interior side. The lower extension plate portion 194 extends downward from the end edge portion on the cabin exterior side of the inner plate portion 193. The bottom plate portion 195 extends from the lower end edge portion of the lower extension plate portion 194 to the cabin exterior side. The back plate portion 196 rises from the end edge portion of the cabin exterior side of the bottom plate portion 195 and abuts the end edge portion of the cabin exterior side of the top plate portion 185 of the lid 180 from below. The side plate portion 197 shown in FIG. 7 extends from the respective end edge portions of the inner plate portion 193, the lower extension plate portion 194, the bottom plate portion 195, and the back plate portion 196 that are continuous on both sides in the vehicle longitudinal direction to close both sides of the housing space 82 in the vehicle longitudinal direction. As shown in FIGS. 7 to 9, support portions 201 that project to the cabin interior side are formed on the lower portion of the cabin interior inner end side of the side plate portions 197 on both sides. The support portions 201 rotatably support at the distal end sides, via a support axis 200 that follows the vehicle longitudinal direction, both end portions in the vehicle longitudinal direction of the bottom end portion of the front plate portion 186 of the lid 180. The support axis 200 and the support portions 201 constitute the coupling portion 190 that rotatably couples the lid 180 to the case body 183. The rotation of the lid 180 is regulated by being engaged to the case body 183 by a plurality of engaging portions not illustrated in the state of the housing space 82 being closed.

In the second embodiment, a stand portion 203, a support projection portion 204, and a flange portion 205 are formed on the top plate portion 185 side of the front plate portion 186. The stand portion 203 projects to the cabin exterior side; the support projection portion 204, which has a shaft shape, projects sideways from the stand portion 203 along the front plate portion 186; and the flat portion 205 projects outward from the distal end of the support projection portion 204 in the diameter direction. A shaft-shaped support projection portion 207 that extends parallel with the support projection portion 204 and a flange portion 208 that projects outward from the distal end of the support projection portion 207 is also formed on the side plate portions 197. A line-shaped strap (regulating member, linear body) 210 that is easily deformable and whose length does not change is hung on the support projection portion 204 of the lid 180 and the support projection portion 207 on the case body 183. That is, the strap 210 has an engaging portion 211 that is formed in a loop on one end of the strap 210 to be coupled to the lid 180 by being hung on the support projection portion 204 of the lid 180 so as to go around thereof and an engaging portion 212 that is formed in a loop on another end of the strap 210 to be coupled to the case body (fixed member) 183 by being hung on the support projection portion 207 of the case body 183 so as to go around thereof. In this way, the opening amount (rotation angle) of the lid 180 with respect to the case body 183 is regulated by the taut state of the strap 210, which couples the lid 180 and the case body 183. Pulling off of the loop-shaped engaging portions 211 and 212 from the support projection portion 204 and 207 is restricted by the flange portions 205 and 208.

Also, a plurality of plate-shaped ribs 216 that extend in the vertical direction while projecting to the cabin exterior side are formed on the cabin exterior side, that is, the air bag 81 side, of the curved portion 215 that is constituted by the mutually proximate sides of the front plate portion 186 and the top plate portion 185 of the lid 180. These ribs 216 are formed so as to join the intermediate position of the top plate portion 185 opposite the front plate portion 186 and the intermediate position of the front plate portion 186 opposite the top plate portion 185, and a guideway 217 of the cabin exterior side forms a circular concave shape. These ribs 216 are on the upper side opposite the support axis 200 of the lower portion, which is the rotation center, when the lid 180 opens. As shown in FIG. 8, when the lid 180 is in the closed state, the guideway 217 inclines to the cabin exterior side toward the upper side thereof. For this reason, when the upward-deploying air bag 81 makes contact with the guideways 217 in the state of the lid 180 being closed, the guideways 217 generate a component force from the thrust of the air bag 81 to the cabin interior direction, i.e., the opening side, of the lid 180 to open the lid 180 in a favorable manner. Moreover, as shown in FIG. 9, when the lid 180 is opened to its limit position, the ribs 216 will come to be roughly parallel with the vertical direction, and so by making contact with the deploying air bag will guide the deployment upward. In other words, the deploying direction will be regulated.

The aforementioned mounting pieces 14 are formed on the lower portion of the case body 183. As shown in FIG. 6, the bolts 15 are inserted into mounting holes 220 of the mounting pieces 14, passed through mounting holes 221 formed in the inner panel 6 and the inner reinforcing panel 36, to be screwed into weld nuts 222 that are fixed to the rear side of the inner reinforcing panel 36. Thereby, the air bag module 10 is attached to the inner panel 6.

The air bag 81 is folded so as to be piled successively upward with respect to the pipe 76, which is the gas supply portion. For this reason, when the air bag deploys by the gas that the inflator 77 generates, it normally deploys upward. Because the air bag module 10 is attached to the cabin interior side of the inner panel 6 as described above, the air bag 81 is disposed on the cabin interior side of the inner panel 6, and when in a folded state, the cabin interior side thereof is covered by the lid 180.

In the second embodiment, when the deployment condition is met during a vehicle collision, such as a G-force equal to or greater than a predetermined amount being detected, the inflator 77 ignites, and the folded air bag 81 inflates by the gas that the inflator 77 generates. When this happens, since the air bag 81 is folded in a manner to be successively overlapped upward, it deploys so as to extend upward from below the window 9 as shown by the double-dashed line in FIG. 6. During deployment, the air bag 81 mainly pushes the guideways 217 of the sloping ribs 216 in the lid 180. The lid 180 is thereby made to rotate, centered on the support shaft 200, to the extent of the opening amount regulated by the straps 210 so as to pass over the contact tongue piece 48. Thereafter, the air bag 81 deploys upward along the inner surface of the window glass 7 of the window 9 above, being guided by the guideways 217 of the ribs 216 in the lid 180.

According to the air bag housing portion structure of the second embodiment described above, when the lid 180, which had closed the housing space 82, is opened by being pushed by the deploying air bag 81, the straps 210 provided on the lid 180 regulate the opening amount of the lid 180. That is, the straps 210, of which one side is coupled to the lid 180 and the other side is coupled to the case body 183, regulate the opening amount of the lid 180. Accordingly, during deployment of the air bag 81, the lid 180 is prevented from cramping the cabin interior space by more than is needed. Moreover, since the lid 180 and the case body 183 may be coupled by the straps 210, the opening amount of the lid 180 can be readily and reliably regulated.

Also, use of line-shaped straps 210 can minimize the space for housing the straps 210.

Moreover, when the lid 180 is opened by being pushed by the deploying air bag 81, the air bag 81 is guided by the ribs 216 of the lid 180 whose opening amount is regulated by the straps 210, and so the deploying direction thereof can be regulated. Accordingly, the deploying direction of the air bag 81 can be favorably controlled.

In addition, the curved portion 215 is formed on the opposite side of the lid 180 with respect to the support shaft 200, which is the rotation center during opening of the lid 180. Providing the ribs 216 in the curved portion 215 can therefore prevent the deploying air bag 81 from abutting the curved portion 215. Accordingly, the air bag 81 can be deployed in a still more favorable manner.

Furthermore, because the deployment of the air bag 81 can be regulated by the ribs 216, which are provided in an extending manner along the vertical direction in the lid 180, they can also function as ribs that increase the rigidity of the lid 180. Accordingly, manufacturing is simplified.

An explanation was given above using as an example the case of providing the lid 180 on the case 175 that houses the air bag 81 of the air bag module 10. However, it may of course also be applied to the case of the lid 180 being directly provided on the door lining 8.

Also, an explanation was given above using as an example the case of hanging the straps 210 on the lid 180 and the case body 183, however, the straps 210 may be hung on the lid 180 and another member which does not move when the air bag 81 deploys. For example, it is possible to hang them on the lid 180 and the inner panel 6, or on the lid 180 and a member other than the case body 183 of the air bag module 10.

Moreover, the second embodiment, similarly to the first embodiment, may be applied to an arrangement structure of an air bag that is provided below a rear side window in a coupe-type vehicle, a housing portion structure for an air bag that is provided below a tailgate window, and also to a housing structure for a side curtain air bag that is provided in a roof side rail above a window, as long as it is a housing portion structure for an air bag that is provided in the vicinity of a window and deploys along the inside surface of the window.

Also, a regulation member was explained above as the ribs 216, but a planar part with a similar height that is made continuous between each of the ribs 216 may be formed as long as it guides the air bag upward by contact therewith.

Figure 10:
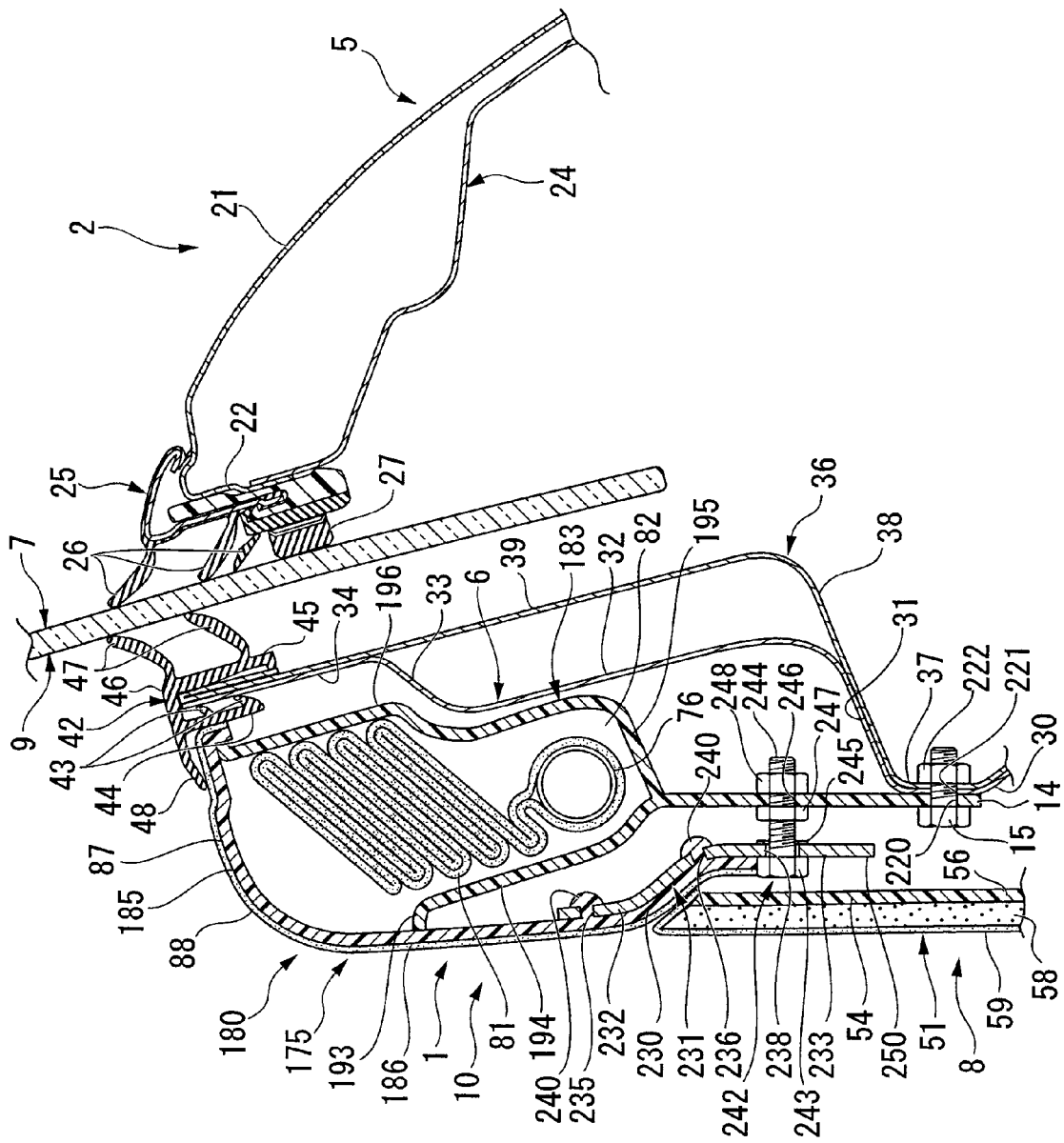
FIG. 10 is a sectional view of the upper portion of a door to which the air bag housing portion structure of the third embodiment of the present invention has been applied.
Figure 11:
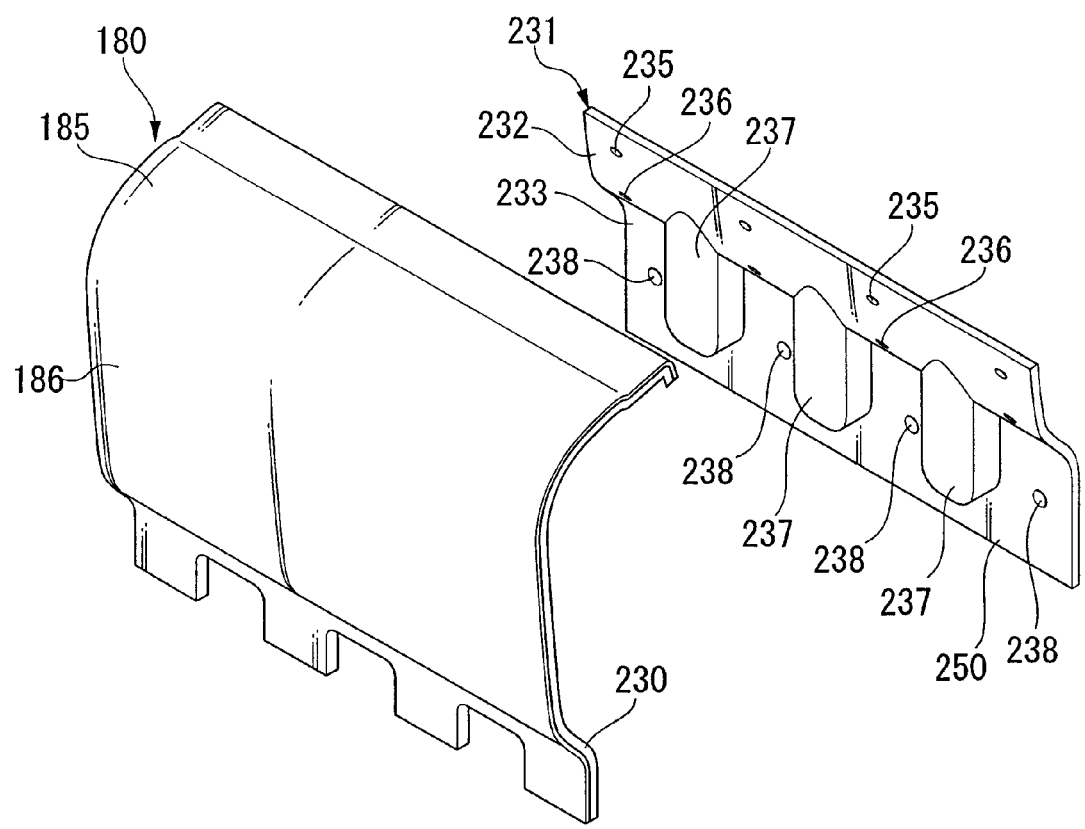
FIG. 11 is an exploded perspective view of the lid and the regulating plate in the air bag housing portion structure of the third embodiment.

Next, the air bag housing portion structure of the third embodiment of the present invention is explained below referring to FIGS. 10 to 12, focusing on portions differing from the aforementioned second embodiment. Therefore, identical constitutions shall be given the same reference numerals and explanations thereof shall be omitted here.

In the third embodiment, first the mounting pieces 14 of the case body 183 of the air bag module 10 extend still lower than in the second embodiment. Also, the inner plate portion 193 of the case body 183 is disposed higher than in the second embodiment. As a result, the lower extension plate portion 194 also extends higher.

The lid 180 of the third embodiment is not supported by the support portions 201 of the second embodiment, being instead supported by intermediate portions of the mounting pieces 14. That is, an inclined plate portion 230 that extends by inclining downward to the cabin exterior side from the lower end edge portion of the front plate portion 186 is provided in the lid 180. A metal regulating plate (regulating member) 231 is fixed to the inner side of the lid 180. This regulating plate 231, as shown in FIG. 11, has an upper plate portion 232 on the upper side and a lower plate portion 233 on the lower side. A plurality of mounting holes 235 are formed in the upper portion of the upper plate portion 232, and a plurality of mounting holes 236 are formed in the lower portion of the upper plate portion 232.

A plurality of bead portions 237 are formed in the lower plate portion 233, and mounting holes 238 are formed on both outer sides of the entirety of these bead portions 237 and between adjacent bead portions 237. The regulating plate 231, as shown in FIG. 10, is joined to the cabin exterior side of the inclined plate portion 230 of the lid 180 by inserting in the mounting holes 235 and 236 a plurality of protruding portions 240 that are provided in a protruding manner from the inclined plate portion 230 side in the lid 180 to the cabin exterior side. When the distal end portions of the protruding portions 240 are subject to heat deformation in this state, the regulating plate 231 is fixed to the lid 180. In this state, the regulating plate 231 extends further downward than the lid 180. Besides such welding, the regulating plate 231 may also be fixed to the lid 18 by caulking or the like.

Bolts 242 with a long axial length are passed through the plurality of mounting holes 238 formed in the lower plate portion 233, and each bolt 242 holds the regulating plate 231 with a locking element 245 that is fitted to a head portion 243 and a shaft portion 244. Thereby, the regulating plate 231 and the lid 180 are held on the head portion 243 side of the bolt 242. The distal end of the shaft portion 244 of the bolt 242 is inserted into a mounting hole 246 that is formed in the mounting piece 14 of the case body 183 and holds the mounting piece 14 with nuts 247 and 248 that are screwed onto both sides of the shaft portion 244. As a result, the regulating plate 231 is supported in a state of being separated from the case body 183 by the bolts 242. In this state, the regulating plate 231 has an extension portion (abutting portion) 250 that extends downward from the bolt 242 side, which is the support portion in the lid 180, i.e., from the base end side of the lid 180. This extension portion 250 faces the mounting piece 14 of the case body 183 from a predetermined separation distance.

Figure 12:
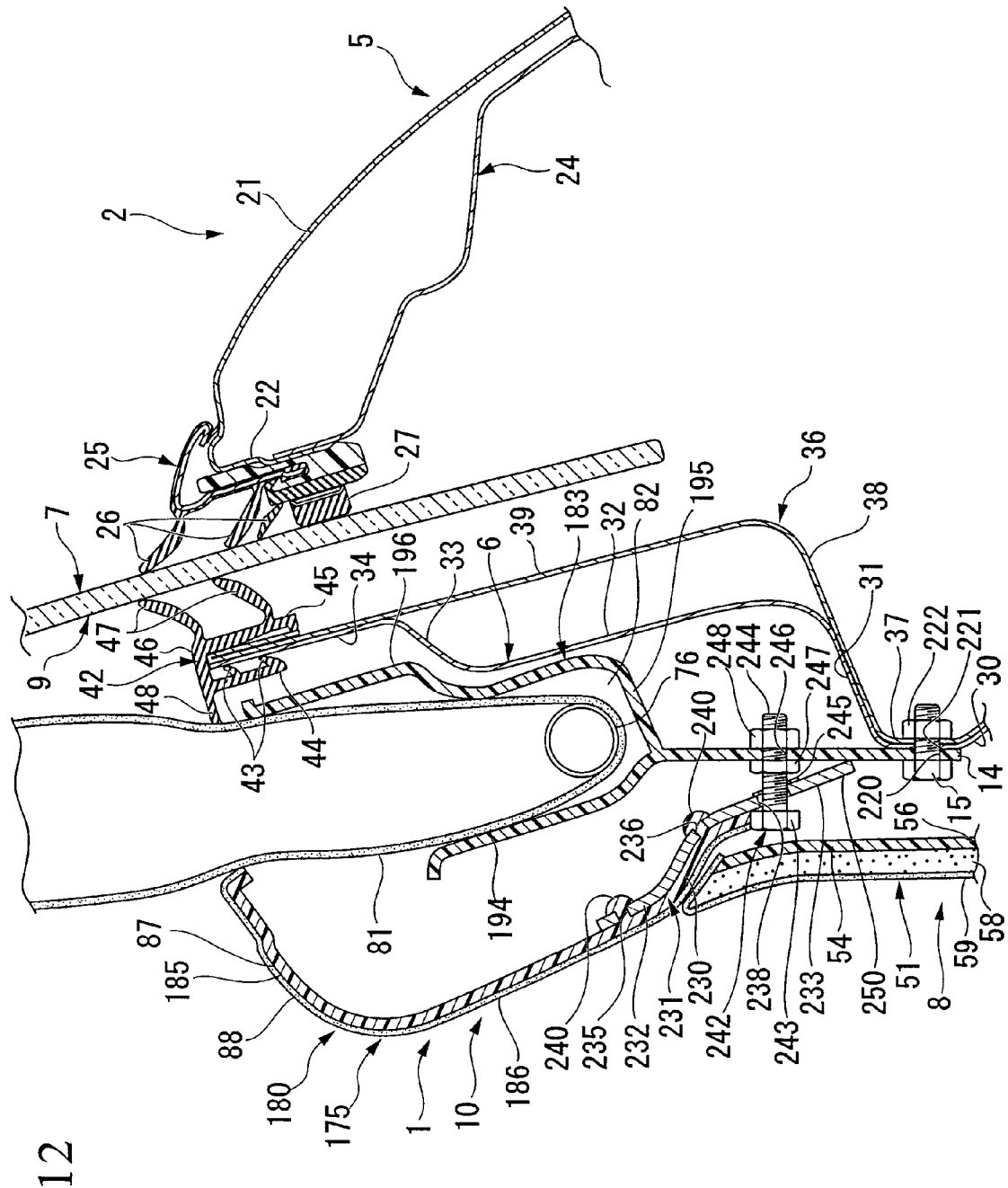
FIG. 12 is a sectional view showing the deployed state of the air bag in a door to which the air bag housing portion structure of the third embodiment has been applied.

According to the air bag housing portion structure of the third embodiment described above, when the lid 180, which had closed the housing space 82, is opened by being pushed by the deploying air bag 81, as shown in FIG. 12, the upper portion of the lid 180 inclines, centered on the vicinity of the bolt 242, so as to shift the upper portion thereof to the cabin interior side while moving the locking element 245 from the head portion 243 of the bolt 242. At this time, the extension portion 250 of the regulating plate 231 that is provided in the lid 180 moves oppositely to the cabin exterior side to abut the mounting piece 14 of the case body (fixed member) 183. Thereby, the tilting, i.e., opening amount, of the lid 180 is regulated. Accordingly, during deployment of the air bag 81, the lid 180 is prevented from cramping the cabin interior space by more than is needed. Also, since the regulating plate 231 may be made to simply abut the case body 183, the opening amount of the lid 180 can be readily and reliably regulated. In addition, since the regulating plate 231 has the extension portion 250 that extends from the base end side of the lid 180, the degree of opening of the lid 180 is not impaired by the regulating plate 231.

Figure 13:
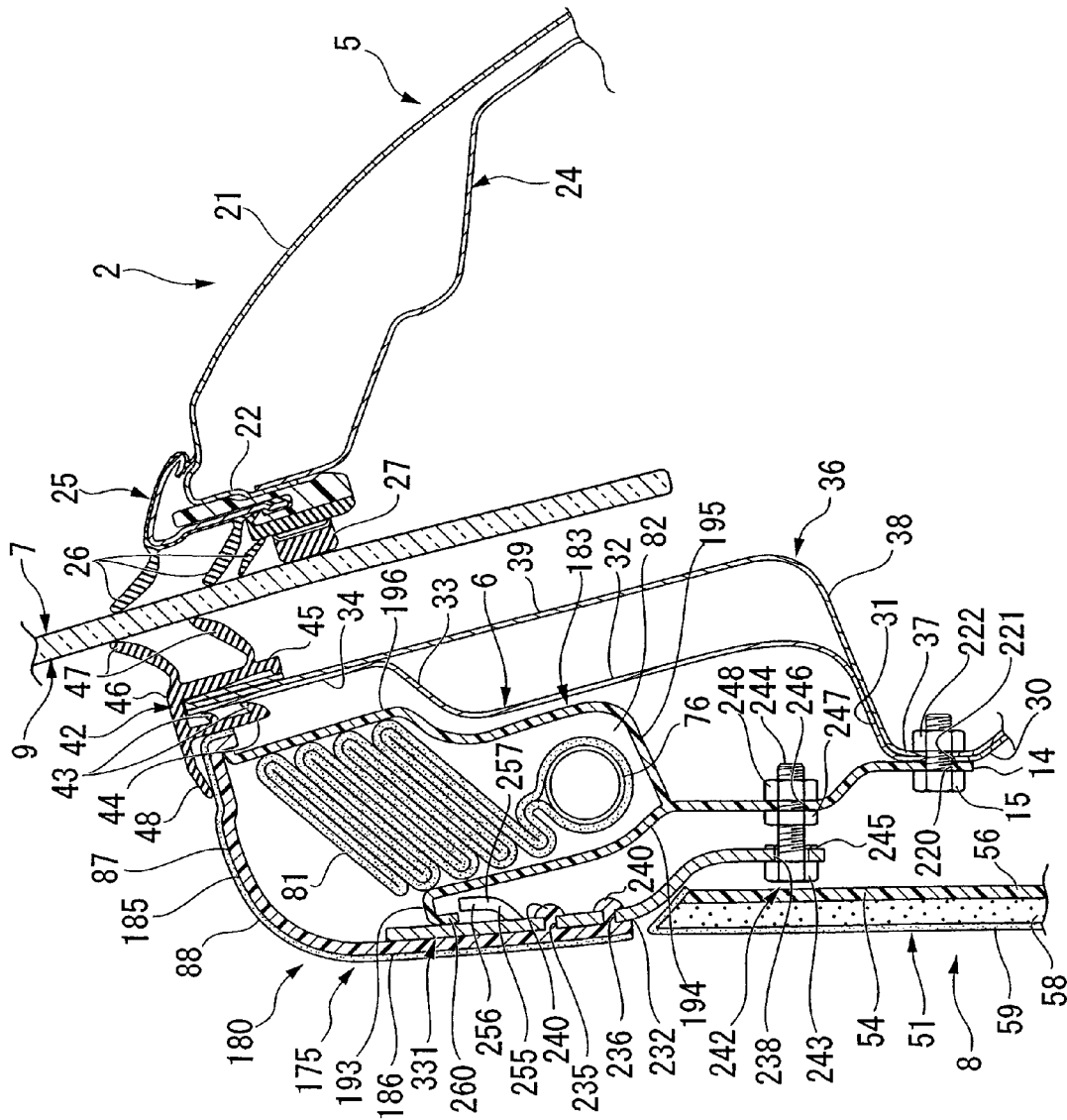
FIG. 13 is a sectional view of the upper portion of a door to which the air bag housing portion structure of the fourth embodiment of the present invention has been applied.
Figure 14:
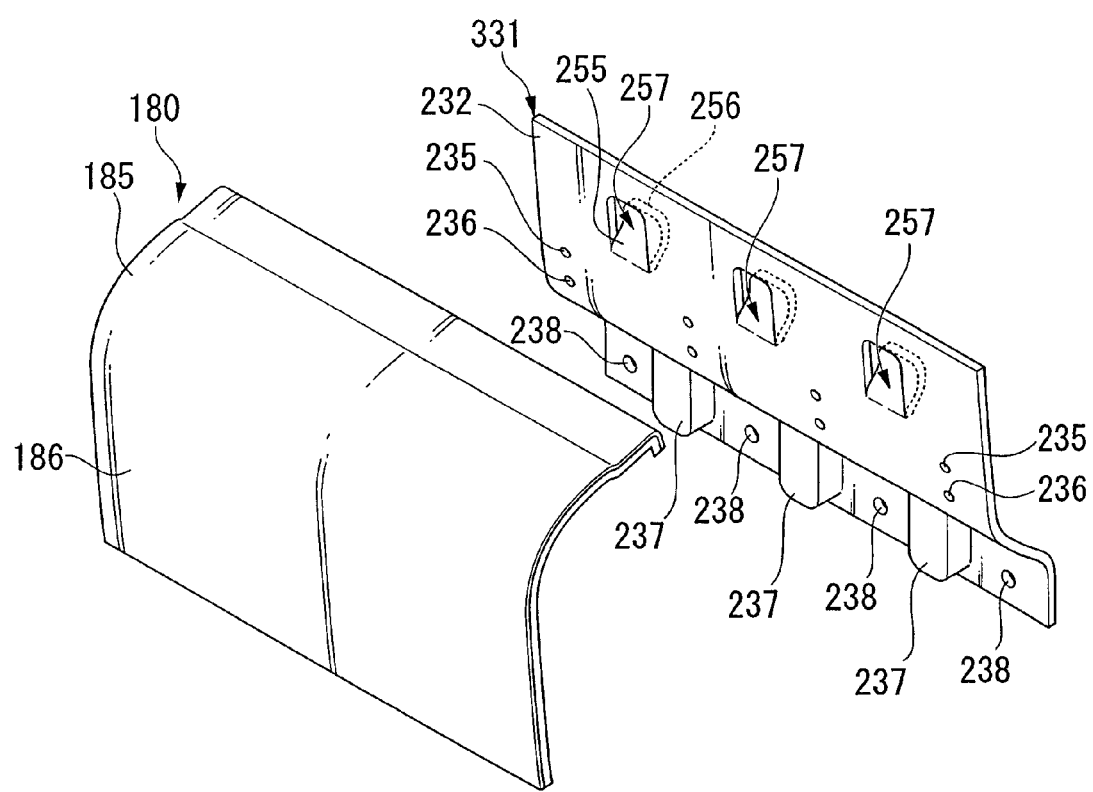
FIG. 14 is an exploded perspective view of the lid and the regulating plate in the air bag housing portion structure of the fourth embodiment.
Figure 15:
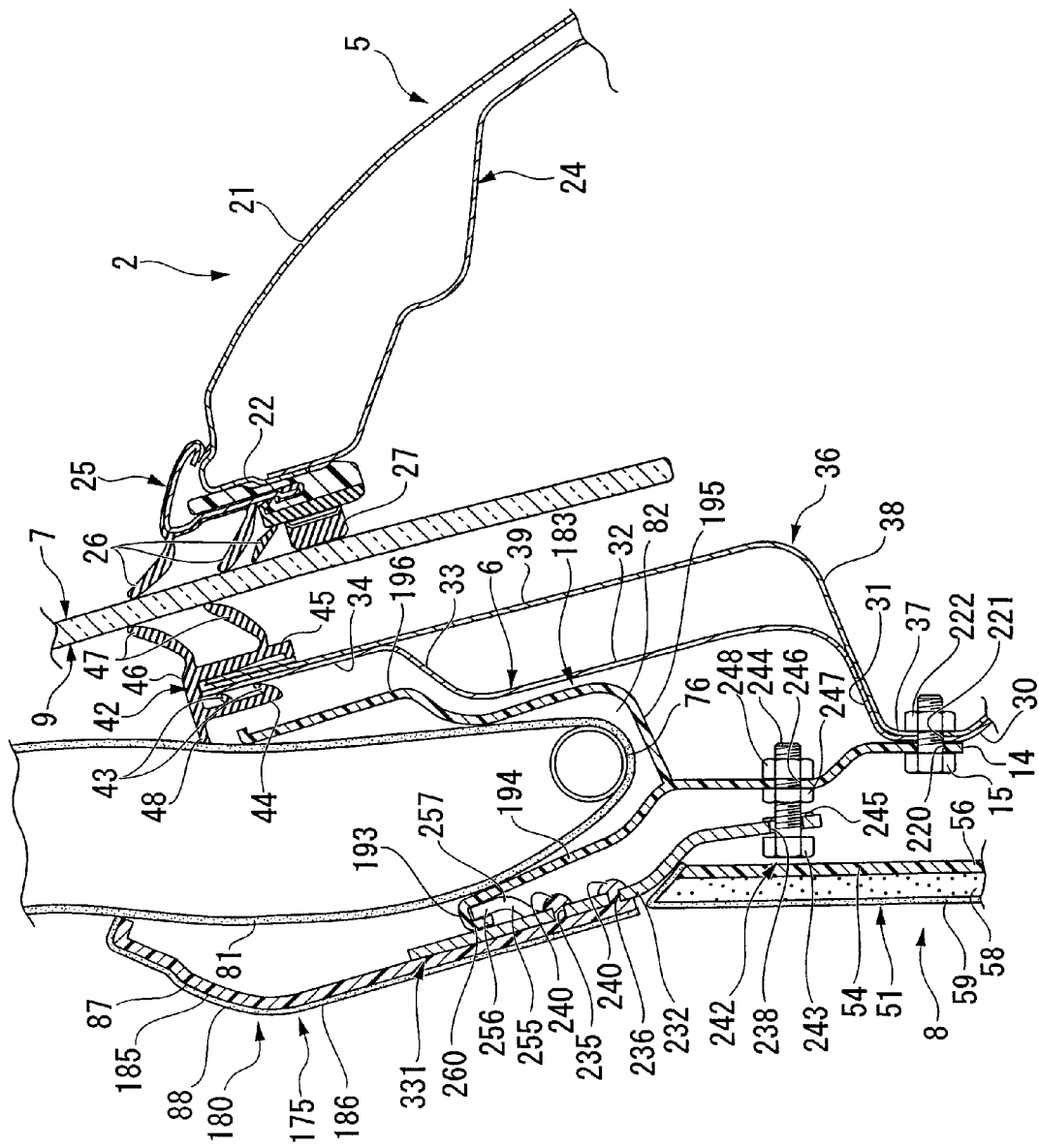
FIG. 15 is a sectional view showing the deployed state of the air bag in a door to which the air bag housing portion structure of the fourth embodiment has been applied.

Next, the air bag housing portion structure of the fourth embodiment of the present invention is explained below referring to FIGS. 13 to 15, focusing on portions differing from the aforementioned third embodiment. Therefore, identical constitutions shall be given the same reference numerals and explanations thereof shall be omitted here.

In the fourth embodiment, a portion of the regulating plate 331 is cut up to form engagement plate portions (plate portion to be engaged, abutting portion) 257, each of them having an inclined plate portion 255 that inclines to the cabin exterior side toward the upper side thereof, and an engagement projection portion 256 that extends almost vertically from the upper end edge portion of the inclined plate portion 255. A claw portion (engagement portion) 260 that extends downward from the end edge portion of the cabin interior side of the inner plate portion 193 is formed above the engagement plate portion 257.

According to the air bag housing portion structure of the third embodiment described above, when the air bag 81 deploys, after the air bag 81 pushes the lower extension plate portion 194 of the case body 183 so as to shift to the cabin interior side, the lid 180, which had closed the housing space 82, is opened by being pushed by the deploying air bag 81. When the lower extension plate portion 194 is pushed, the claw portion 260 of the case body 183 comes to engage with the engagement plate portion 257 of the regulating plate 331 that is joined to the lid 180. As a result, when the engagement plate portions 257 contact with the claw portion 260, thereafter the tilting, i.e., the opening amount, of the lid 180 is regulated. Accordingly, during deployment of the air bag 81, the lid 180 is prevented from cramping the cabin interior space by more than is needed. Also, since the engagement plate portions 257 of the regulating plate 331 may be made to simply contact the claw portion 260 of the case body 183, the opening amount of the lid 180 can be readily and reliably regulated. In addition, since the regulating plate 331 has the engagement plate portions 257 that engages with the claw portion 260 provided on the case body 183 that houses the air bag 81, the degree of opening of the lid 180 can be still more reliably regulated.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. An arrangement structure of an air bag device that is provided on a panel in the vicinity of a window of a vehicle comprising:
   an air bag;
   a first cover that covers a cabin interior side and an upper side of the air bag;
   a second cover that is joined to the first cover directly or via an intermediate member and covers a cabin exterior side of the air bag; and
   a lining that has a notch portion of substantially the same size as the first cover and that is provided on the cabin interior side of the panel;
   wherein an upper end of the first cover contacts a weather strip of the vehicle, an upper end of the second cover is directed to the upper end of the first cover, the air bag in a folded state is housed in a space defined by the first cover and the second cover so as to be deployable through a space between the first cover and the weather strip.

2. The arrangement structure according to claim 1, wherein the first cover has a consecutive appearance with the lining.

3. The arrangement structure according to claim 1, wherein the second cover is fixed to the panel.

4. The arrangement structure according to claim 1, further comprising
   a regulating member that regulates an opening angle of the first cover.

5. The arrangement structure according to claim 4, further comprising
   a fixed member which is fixed to a vehicle body of the vehicle and does not move when the air bag deploys,
   wherein a first end of the regulating member is connected to the first cover and a second end of the regulating member is connected to the fixed member.

6. The arrangement structure according to claim 5, wherein a shape of the regulating member is a line shape.

7. The arrangement structure according to claim 4, further comprising
a fixed member which is fixed to a vehicle body of the vehicle and does not move when the air bag deploys,
wherein the regulating member has an abutting portion that abuts the fixed member.

8. The arrangement structure according to claim 7, wherein the regulating member has an extension portion that extends below the first cover, and the abutting portion is provided on the extension portion.

9. The arrangement structure according to claim 7, wherein the second cover has an engagement portion, and the abutting portion abuts the engagement portion.

10. The arrangement structure according to claim 4, further comprising
a regulating portion regulates the deployment direction of the air bag, being provided on a surface facing the panel of the first cover.

11. The arrangement structure according to claim 10, wherein the first cover has a curved portion that extends in the longitudinal direction of the vehicle, and the regulating portion is provided on this curved portion.

12. The arrangement structure according to claim 10, wherein the regulating portion is a rib that is provided in an extending manner from the first cover.

13. The arrangement structure according to claim 1, wherein the lining is provided such that the first cover is exposed after assembly of the structure and cooperates with the lining to define a cabin-side surface.

14. An arrangement structure of an air bag device that is provided on a panel in the vicinity of a window of a vehicle comprising:
an air bag;
a first cover that covers a cabin interior side of the air bag;
a second cover that is joined to the first cover directly or via an intermediate member;
a lining that has a notch portion of substantially the same size as the first cover and that is provided on the cabin interior side of the panel;
a regulating member that regulates an opening angle of the first cover; and
a fixed member which is fixed to a vehicle body of the vehicle and does not move when the air bag deploys,
wherein the air bag in a folded state is housed in a space defined by the first cover and the second cover, and wherein a first end of the regulating member is connected to the first cover and a second end of the regulating member is connected to the fixed member.

* * * * *